US006994497B1

(12) United States Patent
Eriksson et al.

(10) Patent No.: US 6,994,497 B1
(45) Date of Patent: Feb. 7, 2006

(54) METHOD AND APPARATUS FOR TREATING HIGH PRESSURE PARTICULATE MATERIAL

(75) Inventors: Timo Eriksson, Karhula (FI); Juhani Isaksson, Karhula (FI); Reijo Kuivalainen, Kotka (FI); Pekka Lehtonen, Karhula (FI); Juha Palonen, Varkaus (FI)

(73) Assignee: Foster Wheeler Energia Oy, Helsinki (FI)

( * ) Notice: Subject to any disclaimer, the term of this patent is extended or adjusted under 35 U.S.C. 154(b) by 0 days.

(21) Appl. No.: 10/018,804

(22) PCT Filed: Jun. 19, 2000

(86) PCT No.: PCT/FI00/00546

§ 371 (c)(1),
(2), (4) Date: May 22, 2002

(87) PCT Pub. No.: WO01/00313

PCT Pub. Date: Jan. 4, 2001

(30) Foreign Application Priority Data

Jun. 28, 1999 (FI) ...................................... 991459

(51) Int. Cl.
*B65G 53/36* (2006.01)
(52) U.S. Cl. ...................... 406/124; 414/220; 406/165; 406/171; 406/175; 406/46; 406/127; 406/136
(58) Field of Classification Search ................ 414/220, 414/221; 406/168, 169, 171, 175, 46, 124, 406/125, 126, 127, 136
See application file for complete search history.

(56) References Cited

U.S. PATENT DOCUMENTS

| 3,994,701 | A | * | 11/1976 | Schweimanns | ............. 406/175 |
| 4,790,251 | A | * | 12/1988 | Vidt | ....................... 110/165 R |
| 4,860,669 | A | * | 8/1989 | Collins et al. | .......... 110/165 R |
| 4,877,423 | A | | 10/1989 | Dziobek et al. | ................ 55/27 |
| 4,983,188 | A | | 1/1991 | Mielke et al. | ................. 48/87 |
| 5,066,186 | A | * | 11/1991 | Shimada et al. | ............. 414/221 |
| 5,630,680 | A | * | 5/1997 | Basak et al. | ................. 406/155 |
| 5,707,198 | A | | 1/1998 | Vind | ......................... 414/219 |
| 6,287,056 | B1 | * | 9/2001 | Szikszay | ..................... 406/197 |
| 6,634,833 | B2 | * | 10/2003 | Gillespie | ..................... 406/84 |

FOREIGN PATENT DOCUMENTS

EP 0 582 049 5/1993
JP 7-42910 2/1995

* cited by examiner

*Primary Examiner*—Joe Dillon, Jr.
(74) *Attorney, Agent, or Firm*—Fitzpatrick, Cella, Harper & Scinto

(57) ABSTRACT

An apparatus for pneumatically conveying particulate material containing reaction products of a high pressure reactor from a supply vessel at a pressure of at least two bar to a receiving vessel at a considerably lower pressure. The apparatus includes a conveyor line attached to the supply vessel, a collecting vessel between the conveyor line and the receiving vessel, the collecting vessel including (i) a discharge conduit for the carrier gas, (ii) a device for controlling the discharge velocity of the carrier gas from the collecting vessel, and (iii) a device for controlling the pressure of the material collected in the collecting vessel, and a device for conveying the material directly from the collecting vessel to the receiving vessel essentially at the same pressure as is prevailing in the receiving vessel.

28 Claims, 3 Drawing Sheets

METHOD AND APPARATUS FOR TREATING HIGH PRESSURE PARTICULATE MATERIAL

BACKGROUND OF THE INVENTION

The present invention relates to a method and an apparatus for treating high pressure particulate material.

More particularly, the invention relates to a method and an apparatus for pneumatic conveying of particulate material containing reaction products of a high pressure reactor, by using gas exiting the reactor as a carrier gas, from a supply vessel at a pressure of at least two bar to a receiving vessel at a considerably lower pressure, by using an apparatus comprising a conveyor line and a collecting vessel between the conveyor line and the receiving vessel.

It is generally known to convey solid, powdered or granular material by a pneumatic conveyor system. When transported pneumatically, solid material is conveyed in a tubular conveyor line entrained with the carrier gas flowing therein. Pneumatic conveyance is possible for diluted suspensions, whereby a relatively large quantity of gas conveys a relatively small volume of solid material, or for denser suspensions, whereby a relatively small quantity of gas conveys a relatively large volume of solid material.

Pneumatic conveyance is normally performed by feeding superatmospheric carrier gas to a conveyor line or by providing a low pressure in the receiving vessel in the latter end of the conveyor line. Pneumatic conveyance is especially applicable in situations where the supply vessel is for some other reason at a higher pressure than the receiving vessel. Thus, it could be possible to utilize the gas in the supply vessel for conveying particulate material and it is not necessary to separately arrange a carrier gas supply or pressure difference between the vessels.

U.S. Pat. No. 4,699,210 discloses a system to convey fly ash from a pressurized fluidized bed boiler separated by its particle separator in such a way that the material to be conveyed is led from the bottom portion of the separator to an ash container through a conduit in which its flow direction is sharply changed a repeated number of times. Every change of direction consumes energy, however, whereby the pressure of the flue gas conveying the ash is reduced gradually on its way from the particle separator to the ash container.

Another drawback in this conveyor system is clogging of the conveyor line at its sharp bends, especially if the ash temperature decreases close to the dew point temperature of the carrier gas. To prevent clogging of the line, the ash is conveyed as a thin suspension, whereby the flow rate of the gas needs to be high enough, at least 10–15 m/s. This results, however, in a high consumption of the carrier gas and thus, increases the energy consumption substantially. In addition, the high flow rate can cause strong erosion, especially at the bends of the line where the flow direction changes.

U.S. Pat. No. 4,877,423 discloses a two-stage pneumatic system applicable to conveying and cooling high pressure fly ash, at the first stage of which system, where flue gas is used as a carrier gas, the pressure is reduced only slightly, typically only 0–3 bar. In the end section of the first stage is arranged a precipitator to separate flue gas from ash, and a high pressure supply tank for the ash. Subsequent to the supply tank, the system comprises a lock tank separated by a valve, in which tank, the pressure can be reduced to a level required by the further transport and final cooling of the ash. The disclosed arrangement with a separate precipitator and two tanks is, however, quite complicated and expensive.

Furthermore, the ash discharge of the separator, treating the entire ash quantity and having no longer any carrier gas flow, has a tendency to get clogged up, if the ash is adhesive at least to some extent. This also prevents the ash from being efficiently cooled at the first stage.

SUMMARY OF THE INVENTION

It is an object of the present invention to provide a method and an apparatus for treating particulate material, in which the above-mentioned prior art problems are minimized.

It is a special object of the present invention to provide a simple method and apparatus for controlled pneumatic conveyance and cooling of hot, high pressure particulate material.

It is a further object of the invention to provide a method and an apparatus for pneumatic conveyance of hot, high pressure particulate material, in which no overheating and clogging of the conveyor line occur.

It is also an object of the invention to provide a method and an apparatus, by which the conveying speed of ash can be controlled and the consumption of carrier gas diminished.

In order to solve the above problems, a method according to the present invention is characterized in that a receiving vessel comprises a discharge conduit for carrier gas and means to control the flow rate of the carrier gas, and that the method comprises the steps of:
(a) controlling the pressure in a collecting vessel by using the means to control the flow rate of the carrier gas so that material is conveyed from the supply vessel to the collecting vessel essentially at the same pressure as is prevailing in the supply vessel, and
(b) conveying material from the collecting vessel to the receiving vessel essentially at the same pressure as is prevailing in the receiving vessel.

In order to solve the above prior art problems, an apparatus according to the present invention is characterized in that a receiving vessel comprises a discharge conduit for carrier gas and means to control the discharge velocity of the carrier gas from the collecting vessel, and means to control the pressure of the particulate material collected in the collecting vessel.

The conveyance according to the present invention includes that the flow rate of gas in the conveyor line is preferably relatively low, most preferably, less than 5 m/s and particulate material is conveyed as a dense suspension. When the present invention is applied, the frictional forces of the conveyor line are relatively small, whereby the relatively small pressure difference compared to the pressure prevailing in the supply vessel, typically less than one bar, between the supply vessel and the collecting vessel, provides a desired flow.

Prior to the conveyance, the particulate material may form a thin or a dense layer, e.g., a fluidized bed, in the bottom of the supply vessel. The conveyor line may be attached to the supply vessel at the bottom or on the side thereof.

Particulate material can be preferably cooled in the conveyor line by arranging the line at least in some portions coaxially so that the particulate material flows in the inner tube and the cooling medium, e.g., water or steam, in the outer tube. A mixer also can be provided between the cooled portions, assuring that the material is cooled uniformly. The cooling may also be performed or intensified by arranging a heat exchange surface in the supply vessel, the collecting vessel or the receiving vessel.

To prevent clod formation in the conveyed material, causing clogging of the conveyor line, the material should not be cooled close to the dew point temperature of the carrier gas, i.e., typically, the flue gas of a reactor. When utilizing the ash conveyance system according to the present invention, the cooling of the material in the conveyor line can be continued to a lower temperature, if air is added to the carrier gas. Preferably, this can be performed by fluidizing the material in the bottom of the supply vessel by air, whereby the flue gas content in the carrier gas is diminished, the partial pressure of water, steam and acids is reduced, and the dew point of the carrier gas is decreased.

In the method according to the present invention, the carrier gas flow from the collecting vessel is adjusted so as to create a desired flow rate for the material between the supply vessel and the collecting vessel. As the discharge conduit for the carrier gas is attached to the collecting vessel, the conveyance of the material continues efficiently up to the collecting vessel and the risk that the conveyor line gets clogged up is diminished.

In the following, some preferred embodiments of the present invention are described as applied to the ash conveyance of a pressurized fluidized bed reactor, but equivalent and other embodiments according to the present invention also can be used in connection with other types of reactors and other particulate materials.

If the carrier gas is allowed to discharge from the collecting vessel directly to the open air, a substantial amount of particulate material to be conveyed, e.g., ash, may also be discharged. According to a first preferred embodiment of the invention, the carrier gas is allowed to discharge from the collecting vessel through one or more porous filter elements. The filter elements can be located inside the collecting vessel or in separate gas discharge pipes outside the collecting vessel. From the filter elements, the gas is allowed to be discharged to the open air or to another vessel which is substantially at the same pressure as the receiving vessel, e.g., at atmospheric pressure. The gas flow is controlled by the control elements located downstream of the filter elements, which control elements can comprise, e.g., a control valve or a combination of an orifice plate and a shut-off valve or a combination of a control valve and a shut-off valve.

The ash entrained with the carrier gas to the filter may disturb or even prevent the gas flow. In order to avoid this, the collecting vessel is formed as a settling vessel, whereby it serves as a pre-separator for the ash. As a certain amount of ash is in any case entrained with the carrier gas, the filter elements can preferably be cleaned from the material collected on their surfaces by using high pressure gas pulses.

According to a second preferred embodiment of the invention, the carrier gas is allowed to be discharged from the collecting vessel through an orifice having a proper size directly to the receiving vessel. Thus, the ash entrained with the gas is not allowed to reach the environment, but is directed to the receiving vessel. The drawback of this embodiment could be the erosion or plugging of the orifice, deriving from the ash. To eliminate this problem, the orifices are preferably made easily changeable.

To control the ash flow rate, the gas discharge system comprises preferably two or more parallel gas discharge conduits each having an orifice of the same size or of different sizes between the collecting vessel and the receiving vessel. The carrier gas discharge conduits are provided with valves, by shutting and opening of which the gas discharge and the ash flow in the conveyor line can be controlled.

As the gas is discharged to the receiving vessel, the receiving vessel needs to be provided with a gas discharge opening, e.g., open to the open air, and a filter for preventing the ash from exiting through the discharge opening.

The ash conveyor system according to the above preferred first and second embodiments of the present invention is preferably used intermittently, whereby ash is collected in the collecting vessel until its surface reaches a certain predetermined level. After this, the ash collected in the collecting vessel is discharged to the receiving vessel.

As the receiving vessel is typically at atmospheric pressure or at least essentially at a lower pressure than the collecting vessel during the conveyance of the ash, the pressure of the material to be discharged has to be reduced close to the pressure of the receiving vessel before being discharged from the collecting vessel. To reduce the pressure in the collecting vessel, a shut-off valve can be disposed in the ash conveyor line, preferably, at its end closest to the collecting vessel, making it possible to separate the collecting vessel from the conveyor line.

Preferably, the discharge of the collecting vessel is started by closing the valve controlling the gas exhaust from the collecting vessel. Thus, the gas pressure in the conveyor line is increased essentially to the same pressure level as the gas in the supply vessel, and the ash flow in the conveyor line is stopped. Next, the shut-off valve arranged in the conveyor line is shut and the valve controlling the discharge of the gas in the collecting vessel is reduced. When the pressure is low enough, the collected ash is removed from the collecting vessel to the receiving vessel.

The collecting vessel can preferably be disposed above the receiving vessel, whereby the ash is allowed to fall directly down to the receiving vessel, after the pressure in the collecting vessel has been allowed to fall to the same level as the pressure in the receiving vessel.

The ash also can be conveyed from the collecting vessel to the receiving vessel by other means, e.g., by using a screw or pneumatically, whereby the pressure in the collecting vessel can remain even slightly higher than the pressure in the receiving vessel, when the pressure is reduced, and the carrier gas can be used for conveying the ash to the receiving vessel.

An essential idea of the present invention is that the valve disposed in the conveyor line is not used for controlling the ash conveying speed, but is used only for separating the collecting vessel from the conveyor line after the ash flow has been stopped by the valves controlling the gas discharge.

The valves controlling the gas exhaust can preferably be used not only for stopping the ash conveyance for the discharge of the collecting vessel, but also for controlling the ash conveying speed. It is especially preferable to change the conveying speed intermittently, e.g., so that the conveyance is performed essentially at constant speed, but is stopped completely at regular intervals. Thus, excessive rising or falling of the temperature as well as the generation of agglomerations disturbing the conveyance can be prevented. If ash is collected only to a minor extent, even carrier gas can be saved by using intermittent ash conveyance, thus improving the efficiency of the plant.

Intermittent stopping of the ash conveyance can be controlled on the basis of certain variables measured in the conveyance system. The ash conveyance can be stopped, e.g., when the temperature of the ash entering the collecting vessel or the pressure difference between the supply vessel and collecting vessel is too high or too low. Too high a temperature indicates that the volume of ash to be conveyed is so large that the cooling has no time to reduce its temperature sufficiently. Too high a pressure difference indicates that the line might be about to get plugged and the gas discharge from the collecting vessel has to be temporarily shut in order to control the situation.

On the other hand, too low a pressure difference or temperature of the entering ash can indicate that the ash conveyance is insignificant, probably for the reason that there is no ash in the supply vessel. In this case, the conveyance should be temporarily stopped in order to save carrier gas and energy. Excessive cooling of the ash also increases the risk of plugging the conveyor line. The temperature of the ash entering the collecting vessel is preferably less than 300° C., and more preferably, 100–200° C. The pressure difference between the supply vessel and the collecting vessel is preferably 0.1–1.0 bar or less than 0.3 bar for each ten meters of the conveyor line.

The conveyor systems according to the above-described first and second embodiments of the present invention can be used, e.g., for conveying fly ash separated by a flue gas filter unit of a pressurized fluidized bed reactor used for combustion or gasification of material.

According to a third preferred embodiment of the present invention, the collecting vessel has a tubular form and it is arranged in a vertical position so that ash enters the collecting vessel through its upper part. Typically, the proportion of the height and the diameter of the collecting vessel is at least five, more preferably, at least ten, but it can preferably be even over thirty. Thus, the first gas discharge pipe provided with a filter is preferably disposed in the lower part of the vessel and the ash discharge system in the bottom of the vessel. There are possibly a plurality of gas discharge pipes at various levels of the vessel. The filter attached to the discharge pipes can preferably be arranged inside the tubular collecting vessel in contact with the material to be conveyed.

When using the ash discharge system according to the third preferred embodiment, the ash disposal from the collecting vessel is preferably controlled by an ash column having an approximately constant height in the tubular collecting vessel. As the carrier gas passes through the ash column, its pressure falls without any separate means, so that ash can be removed from the lower part of the collecting vessel, directly to an ash container, e.g., at atmospheric pressure. This kind of a conveyance system is particularly suitable for removing coarse bottom ash, e.g., from the furnace of a fluidized bed reactor used for combustion or gasification of material.

The collecting vessel according to the above-described third embodiment can also be dimensioned so that it has a self-adjusting overfill protector. Thus, the diameter and the height of the vessel have to be such that the airflow through the ash columns slows down essentially before the ash column in the vessel is too high, whereby the ash conveyance to the collecting vessel is reduced or even stopped completely.

In all of the above-described embodiments, the conveyor line comprises parts that can be oriented with any desired position, i.e., vertical, horizontal or oblique. If necessary, the flow of the particulate material in the conveyor line, especially where the line is bent, can be assisted by introducing small quantities of carrier gas, e.g., air, into the line continuously or intermittently.

The invention is characterized in that there are no valves for controlling the conveying speed of the ash in the ash conveyor line. There can be shut-off valves in the line intended to be used when a portion of the system needs to be separated from the others, e.g., for maintenance.

BRIEF DESCRIPTION OF THE DRAWINGS

In the following, the invention will be described in more detail with reference to the accompanying drawings, in which FIG. 1 schematically illustrates an ash conveying system according to a first preferred embodiment of the present invention.

DESCRIPTION OF THE PREFERRED EMBODIMENTS

Figure 1:
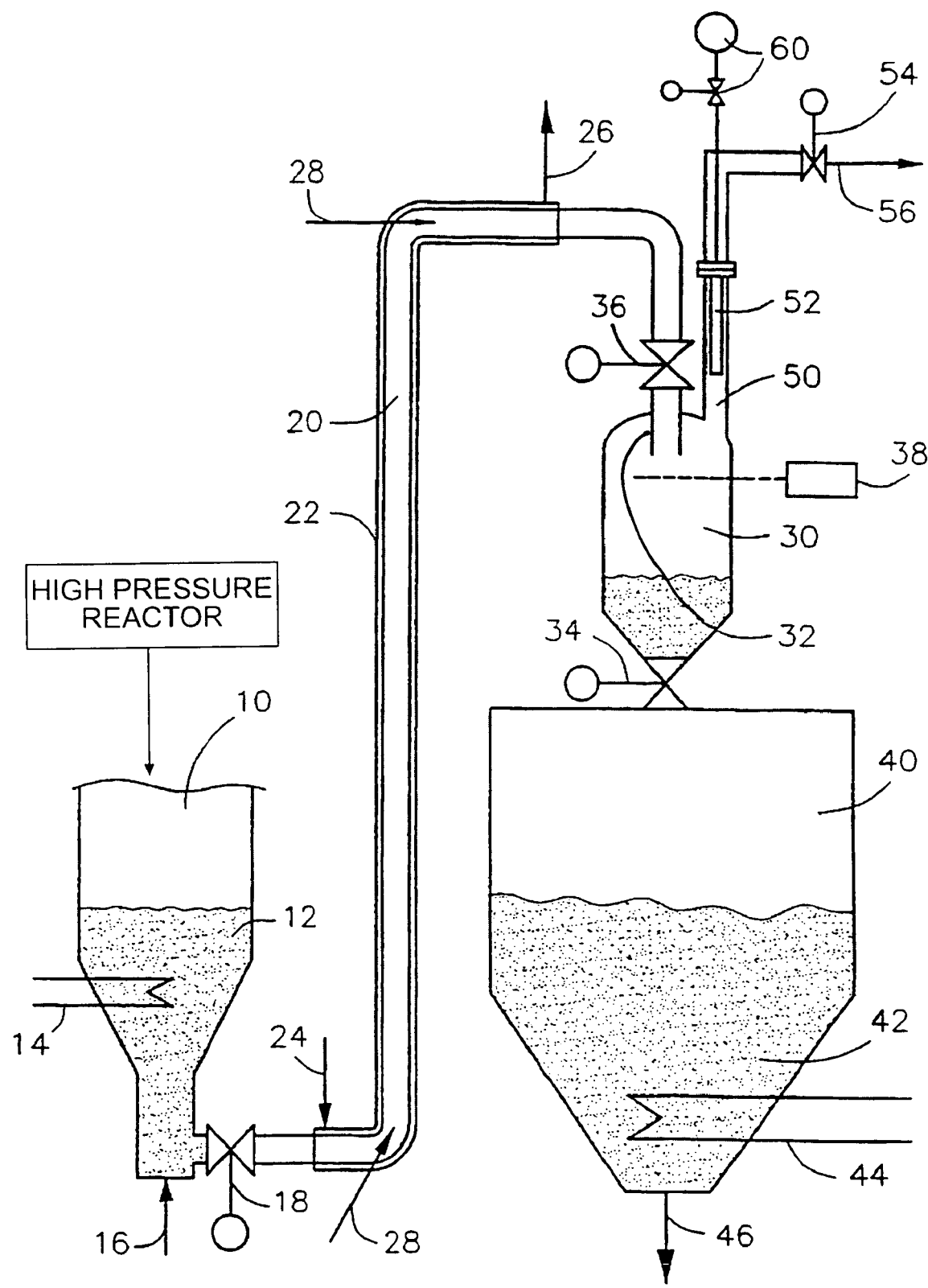

FIG. 1 illustrates an ash conveying system according to a first preferred embodiment of the present invention, in which a supply vessel 10, an ash conveyor line 20 and a receiving vessel 40 can be similar to those even in other preferred embodiments. The various embodiments differ from each other mainly in how the carrier gas discharge from a collecting vessel 30 and the pressure reduction of the collected material are arranged.

The invention is characterized in that particulate material containing reaction products of a reactor is conveyed pneumatically from a supply vessel 10 at a pressure of at least 2 bar, typically at 6–20 bar, to a receiving vessel 40, e.g., at atmospheric pressure, using the gas exiting the reactor as a carrier gas. When applying the invention, the volume of the supply vessel is typically larger than the volume of the conveyor line and it can be assumed that the pressure of the supply vessel 10 is constant.

The supply vessel 10 can consist, e.g., of a bottom part of a filter for fly ash removal from a high pressure fluidized bed reactor or it can be a part of the removal system for bottom ash from a fluidized bed reactor. In the former case, the ash 12 collected in the supply vessel 10 is powdered, compressible fly ash, whereas in the latter case, the ash could be coarse. The quality of the ash to be conveyed has to be considered when choosing the embodiment and the method, by which the system according to the present invention is applied.

In the supply vessel 10, the ash temperature is typically 400–1200° C. and for precooling the ash, the vessel 10 can be provided with heat exchange surfaces 14, e.g., heat exchange pipes, in which water or steam circulates.

The ash is conveyed in a tubular conveyor line 20, in which a heat exchange surface could be arranged, e.g., a sleeve 22 covering the line at least partly and having means 24, 26 for the recirculation of a heat exchange medium, e.g., water or steam. By the heat exchange surfaces 22, the ash temperature can be reduced, e.g., to 150–300° C.

It is possible to arrange means 16 for the introduction of fluidizing gas, e.g., air, at the bottom of the supply vessel 10. This can prevent the clogging of the lower part of the collecting vessel 30 deriving from the arching of the ash. Further, fluidizing air can be mixed in the carrier gas used in the conveyance, to reduce its dew point. Thus, the clogging of the conveyor line due to moistening as the result of the ash cooling can be prevented.

In FIG. 1, the conveyor line 20 starts below the supply vessel 10, turns upwards after the horizontal section and leads again horizontally above the collecting vessel 30. In practice, the conveyor line can consist of parts with any desired position. To avoid the clogging of the line, it could be occasionally or continuously necessary to add small quantities of carrier gas 28, e.g., air, to some points of the line, especially to the bent sections.

The ash conveyor line 20 ends in the collecting vessel 30, to which a discharge conduit 50 for carrier gas is attached. The conveyor line 20 is preferably formed of an extension part 32 extending slightly into the collecting vessel and directing the ash towards the bottom of the collecting vessel 30, thus reducing the probability of the ash being entrained with the gas to the discharge conduit 50. The collecting vessel 30 is also formed so as to reduce the speed of the carrier gas essentially when flowing from the extension part 32 of the conveyor line 20 to the collecting vessel. Thus, the collecting vessel serves as a settling chamber for ash, separating a substantial part of the ash conveyed by the carrier gas.

In the embodiment according to FIG. 1, the discharge conduit 50 is provided with a filter 52 and a control valve 54 for controlling the flow rate of the discharged carrier gas 56. The discharge conduit 50 leads preferably to the open air or to a space essentially at atmospheric pressure. If the pressure of the receiving vessel differs from the atmospheric pressure, it is preferably to draw the discharge conduit 50 to a space essentially at the same pressure as that of the receiving vessel 40.

As ash can be entrained with the carrier gas to filter 52, the filter 52 is provided with a system 60 for cleaning the filter 52 by giving intermittent gas pulses to the clean side thereof.

In the embodiment according to FIG. 1, the collecting vessel 30 is arranged immediately above the receiving vessel 40. The collecting vessel 30 is separated from the receiving vessel 40 by a gas tight valve 34. There is also a gas tight valve 36 between the collecting vessel 30 and the conveyor line 20.

The present invention is characterized in that the gas discharge speed is adjusted by a control valve 54 so as to convey ash in the line 20 as a dense suspension, the flow rate of the carrier gas being less than 5 m/s. Thus, the erosion and consumption of carrier gas caused by the conveyance are relatively insignificant. Valve 34 is shut and valve 36 is open during the conveyance. It is to be noted that valve 36 is not used for controlling the conveying speed of the ash or for stopping thereof.

In the technical solution according to FIG. 1, a valve 18 is also arranged between the supply vessel 10 and the conveyor line 20. The system may include such a valve and possibly even other valves not marked in the figure, as they do not have any significance from the viewpoint of the present invention. Valve 18 could be needed, e.g., when maintaining the system, but in normal operation, the valve is open.

When the level transmitter 38 attached to the collecting vessel 30 indicates that the collecting vessel 30 is about to get filled, the ash conveyance is stopped. The carrier gas flow is stopped by shutting valve 54. When the ash conveyance is stopped, valve 36 is shut. After this, valve 54 is reopened and the pressure of the collecting vessel is allowed to fall so that it is essentially the same as the pressure of the receiving vessel and the ash can fall down into the receiving vessel by opening the valve 34.

To restart the ash conveyance, valve 34 is shut, valve 36 is opened and the ash flow rate is adjusted by valve 54 to a desired value. To protect valve 36, it could be necessary to raise the pressure of the collecting vessel essentially to the same level as that of the supply vessel 10. This can prefer-ably be performed by using the same system 60 that produces clean pulses for the filter 52 of the discharge conduit 50. Simultaneously, the filter 52 is also cleaned from ash possibly collected on its surface at the preceding filling stage of the collecting vessel 30. The receiving vessel 40 can be provided with heat exchange surfaces 44 for the final cooling of the ash as well as with an opening for ash discharge 46 in the bottom of the vessel 40.

The ash conveyance system according to the present invention is preferably used intermittently also between the discharges of the collecting vessel 30 so that the temperature $T_1$ of the ash entering the collecting vessel 30 at the end of the conveyor line 20 and the pressure difference $\Delta p$ between the supply vessel 10 and the collecting vessel 30 are monitored. When the temperature $T_1$ or the pressure difference $\Delta p$ is not within the predetermined limits, the discharge of carrier gas and the ash conveyance are stopped by valve 54. Sometimes, it could be sufficient to perform the ash conveyance in a predetermined way intermittently. The ash conveyance can also be stopped when it is detected that the volume of ash in the supply vessel 10 falls below a predetermined level.

Figure 2:
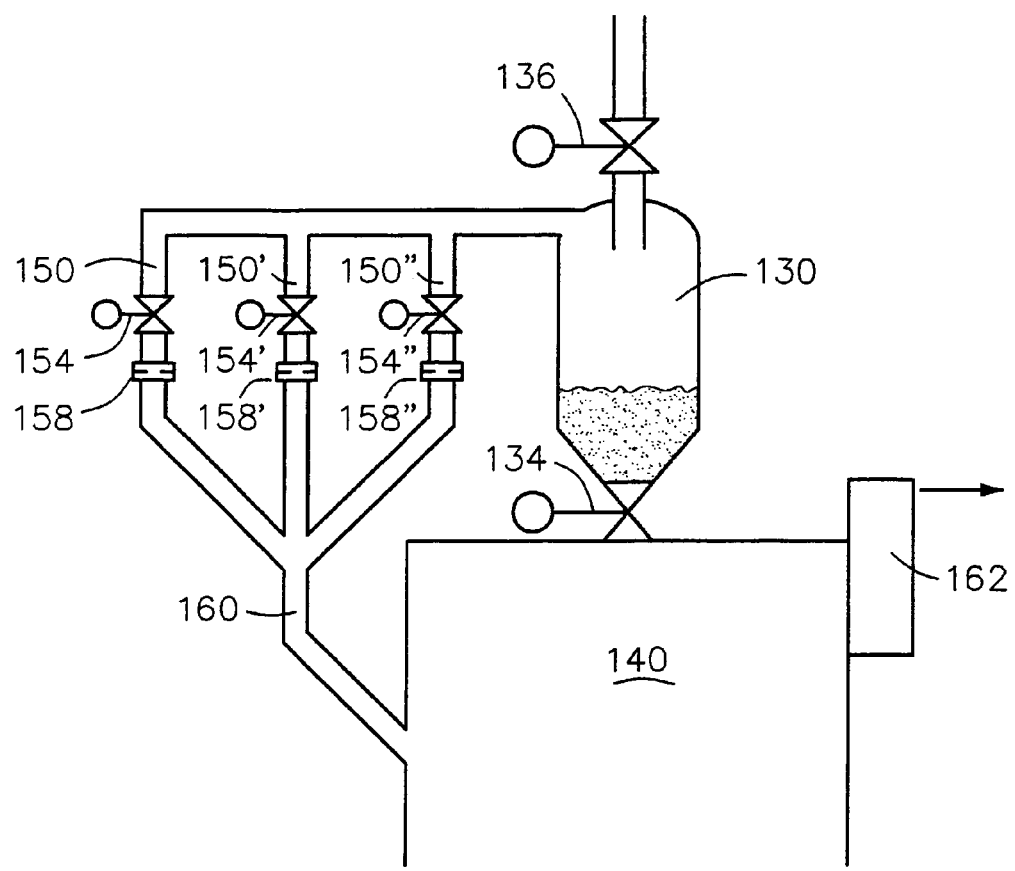
FIG. 2 schematically illustrates the outlet end of the ash conveying system according to a second preferred embodiment of the present invention.

FIG. 2 schematically illustrates the outlet end of the ash conveying system according to a second preferred embodiment of the present invention. There, the collecting vessel 130, receiving vessel 140, valves 136 and 134 and the parts not shown in the figure are similar to those in the embodiment according to FIG. 1. The operation principle of this embodiment is also similar to that of the embodiment according to FIG. 1.

The second preferred embodiment according to FIG. 2 differs from the first preferred embodiment according to FIG. 1 in that the discharge conduit for carrier gas is in communication with the receiving vessel 140. Thus, the ash entrained with the carrier gas is also led to the receiving vessel 140. Naturally, when using the second preferred embodiment according to FIG. 2, the receiving vessel 140 has to be provided with a discharge conduit for gas, e.g., to open the open air, and a filter 162 preventing the ash from being entrained out with the gas.

In the embodiment according to FIG. 2, the discharge conduit is divided into three parallel conduits 150, 150', 150" joining to one conduit 160 before reaching the receiving vessel 140. As the ash entrained with the carrier gas could deteriorate the operational condition of the control valve, the control valve 54 of FIG. 1 has been replaced by steadier shut-off valves 154, 154', 154" and critical openings 158, 158', 158", like or unlike each other, restricting the gas flow. Naturally, the number of parallel conduits can also be different from three.

In the embodiment according to FIG. 2, the ash conveying speed can be controlled by opening a necessary number of the shut-off valves 154, 154', 154". If ash is conveyed periodically, the extent of the conveyance can also be regulated by changing the duration of the periods, whereby it is not necessary to have more than one discharge conduit, shut-off valve and critical opening.

Figure 3:
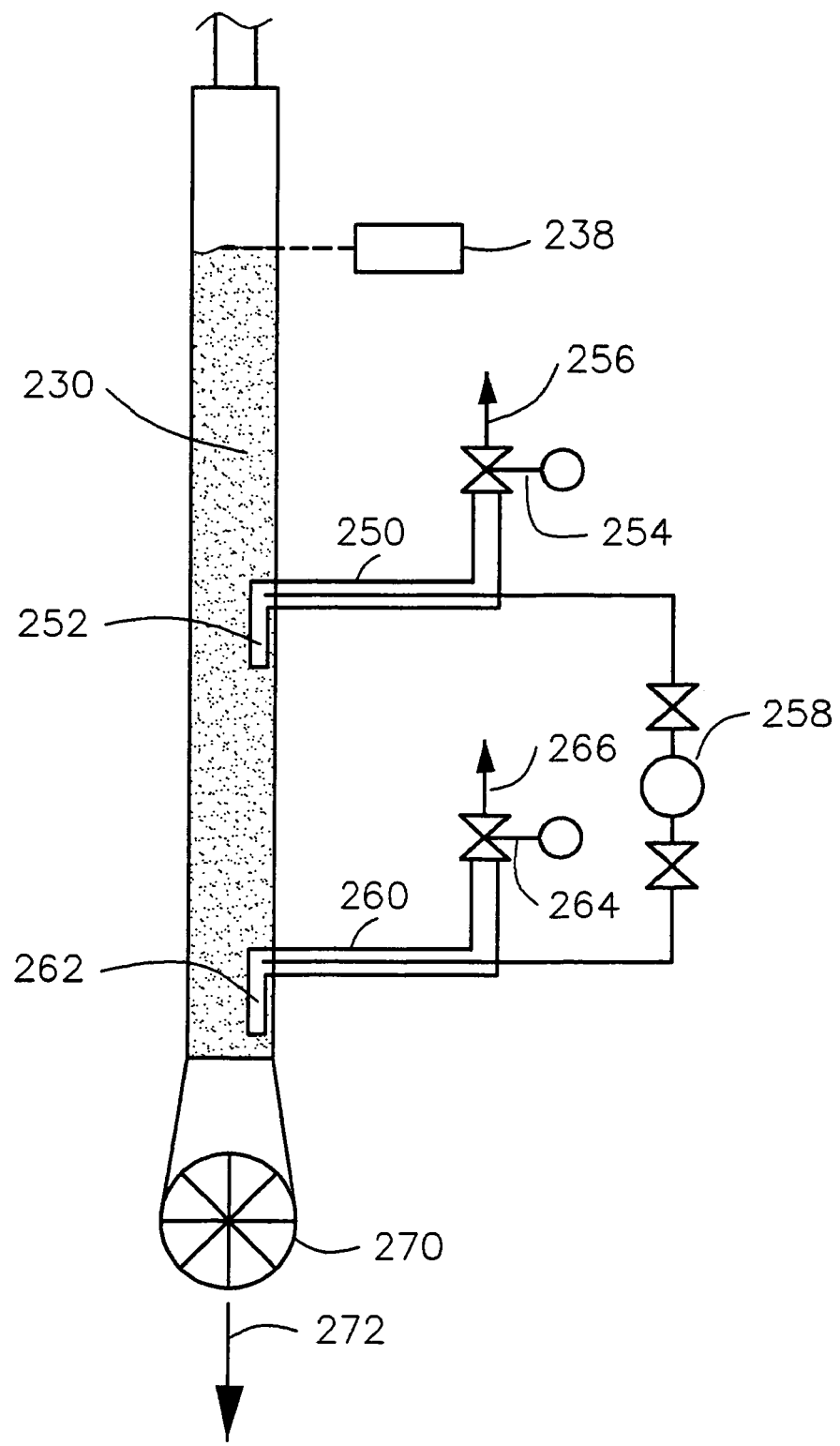
FIG. 3 schematically illustrates the outlet end of the ash conveying system according to a third preferred embodiment of the present invention.

FIG. 3 schematically illustrates the outlet end of the ash conveying system according to a third preferred embodiment of the present invention. In this embodiment, the collecting vessel 230 at the end of the conveyor line is narrow and high, even though its diameter is larger than that of the conveyor line. The proportion of the height of the collecting vessel to its diameter is preferably at least five, most preferably at least ten.

When conveying ash, an ash column is maintained in the collecting vessel 230 extending preferably at least to the center part of the vessel 230. In the embodiment according to the figure, the ash flow is regulated by a discharge conduit 250 for carrier gas attached to the center part of the collecting vessel 230, in which conduit, the volume of carrier gas 256 can be regulated by a valve 254. At the end of the discharge conduit 250 closest to the collecting vessel 230 is arranged a filter 252 preventing the ash from entering the discharge conduit 250. When the filter 252 is disposed according to the figure inside the ash column flowing downwards, the moving ash simultaneously cleans the outer surface of the filter 252 and prevents the filter 252 from being clogged up.

Another advantage gained by arranging the first end of the discharge conduit 250 in the area of the ash column is that the portion of the ash column above the joining point of the discharge conduit 250 also acts as a restrictor for the carrier gas flow. Thus, the ash conveyance is partly self-adjusting as the high ash column slows down the gas flow and reduces or even stops the ash conveyance, when the collecting vessel 230 is about to get filled.

The discharge conduit 250 can also be arranged in the upper part of the collecting vessel 230, whereby it functions in the same way as the discharge conduit 50 according to the first preferred embodiment in FIG. 1. It is also possible to connect the discharge conduit 250 to the lower part of the collecting vessel 230, whereby the flow regulating effect of the ash column is at its highest.

FIG. 3 also shows another discharge conduit 260 for gas provided with a filter 262 and a control valve 264. The purpose of the discharge conduit 260 is to let the carrier gas 266, discharged from the lower part of the collecting vessel 230, enter the open air without any particular obstruction, i.e., during the ash conveyance, valve 264 does not essentially limit the gas flow. Thus, the lower part of the collecting vessel 230 reaches the atmospheric pressure and the ash 272 can be easily removed from the lower part of the collecting vessel 230 to the receiving vessel (not shown), e.g., by using a rotary feeder 270. The discharge apparatus for ash at the bottom of the collecting vessel 230 can also be of another type, e.g., a conveyor screw or an L-valve. Pressure adjusting in the collecting vessel 230 can also be practiced in many steps, whereby more than the mentioned two discharge conduits 250 for gas are disposed in the collecting vessel 230.

FIG. 3 also shows a level transmitter 238 provided in the upper part of the collecting vessel 230, and an apparatus 258 for feeding high pressure cleaning pulses to the filters 252 and 262. The collecting vessel 230 can also be used so that the upper surface of the ash column is continuously maintained at a desired predetermined level by using a rotary feeder 270. Another possibility is to use a rotary feeder intermittently, whereby the ash level remains within certain predetermined limits.

When starting the ash treatment system according to FIG. 3, e.g., sand can be fed to the collecting vessel 230 through a separate conduit not shown in FIG. 3, whereby a sand column restricts the gas flow at the starting stage.

The invention has just been described in connection with embodiments that are presently considered to be the most preferable. It must, however, be understood that the invention is not limited to these embodiments. Rather, it covers a number of other arrangements within the scope of invention determined by the claims below. For example, a plurality of ash conveyor lines can lead into the same collecting vessel.

We claim:
1. A method of conveying particulate material containing reaction products of a high pressure reactor, from a supply vessel at a high pressure to a receiving vessel at a considerably lower pressure, said method comprising the steps of:
  (a) providing a supply vessel that discharges particulate material supplied by a high pressure reactor;
  (b) providing a collecting vessel that collects the particulate material discharged from the supply vessel and selectively discharges the particulate material;
  (c) providing a receiving vessel that receives the particulate material discharged from the collecting vessel;
  (d) pneumatically conveying the particulate material discharged from the supply vessel, via a conveyor line, to the collecting vessel using a gas exiting the reactor as a carrier gas, the particulate material being conveyed from the supply vessel to the collecting vessel at essentially at the same pressure as is prevailing in the supply vessel;
  (e) discharging the carrier gas from the collecting vessel through a discharge conduit;
  (f) controlling the rate at which the carrier gas is discharged from the collecting vessel to control the flow rate of the particulate material in the conveyor line;
  (g) further controlling the rate at which the carrier gas is discharged from the collecting vessel to control the pressure in the collecting vessel; and
  (h) conveying the particulate material directly from the collecting vessel to the receiving vessel at essentially the same pressure as is prevailing in the receiving vessel.

2. A method according to claim 1, further comprising performing step (d) by conveying the particulate material as a dense suspension, the flow rate of the carrier gas in the conveyor line being less than 5 m/s and the pressure drop being 0.1–1.0 bar.

3. A method according to claim 1, wherein the temperature of the particulate material in the supply vessel is 400–1200° C. and further comprising providing the conveyor line with heat exchange surfaces, by which the temperature of the particulate material in step (d) is reduced to less than 300° C.

4. A method according to claim 3, further comprising fluidizing the particulate material in the supply vessel by air that is mixed in the carrier gas, thus decreasing the dew point of the carrier gas.

5. A method according to claim 1, further comprising arranging a filter in the discharge conduit, wherein controlling the rate at which the carrier gas is discharged from the collecting vessel in steps (f) and (g) is performed by a control valve downstream from the filter, and, in step (e), the carrier gas is discharged from the collecting vessel to a space that is at essentially the same pressure as is prevailing in the receiving vessel.

6. A method according to claim 1, further comprising discharging the carrier gas from the collecting vessel to the receiving vessel in step (d).

7. A method according to claim 6, further comprising providing more than one parallel line for the discharge of the carrier gas between the collecting vessel and the receiving vessel, which lines are provided with a constantly open flow restricting element and a shut-off valve, and performing the control of the discharge velocity by opening and shutting the shut-off valves.

8. A method according to claim 7, wherein the flow restricting elements are easily changeable.

9. A method according to claim 5, wherein the collecting vessel has an elongated form and is arranged in a vertical orientation, and further comprising maintaining a column of particulate material in the collecting vessel, and attaching the discharge conduit for carrier gas to the collecting vessel at the bottom section of the particulate material column.

10. A method according to claim 9, further comprising providing more than one discharge conduit for the carrier gas, the discharge conduits being attached to the collecting vessel at various levels of the particulate material column.

11. A method according to claim 9, further comprising maintaining the pressure in the bottom section of the particulate material column to be approximately the same as is prevailing in the receiving vessel and practicing step (f) intermittently or continuously from the bottom section of the collecting vessel.

12. A method of conveying particulate material according to claim 1, further comprising disposing a gas tight inlet valve in the conveyor line before the collecting vessel and a gas tight discharge valve between the collecting vessel and the receiving vessel, and practicing steps (d)–(h) in alternation, wherein steps (f), (g), and (h) further comprise the sub-steps of:
  (f1) stopping the discharge of the carrier gas from the collecting vessel, whereby the conveyance of the particulate material is stopped;
  (g1) closing the inlet valve before the collecting vessel;
  (g2) discharging the carrier gas from the collecting vessel until the pressure in the collecting vessel has dropped to essentially the same pressure as is prevailing in the receiving vessel;
  (h1) opening the discharge valve and conveying the particulate material from the collecting vessel to the receiving vessel; and
  (h2) closing the discharge valve, opening the inlet valve, and returning to step (d).

13. A method according to claim 1, further comprising disposing the collecting vessel above the receiving vessel and, in step (h), allowing the particulate material to fall down into to the receiving vessel.

14. A method according to claim 1, further comprising in step (f), periodically changing the flow rate of the particulate material in the conveyor line by stopping the conveyance for a predetermined period of time at regular intervals or when the pressure in the collecting vessel or the temperature of the particulate material entering the collecting vessel is not within predetermined limits.

15. An apparatus for conveying particulate material containing reaction products of a high pressure reactor from a supply vessel at a high pressure to a receiving vessel at a considerably lower pressure, said apparatus comprising:
  a supply vessel that discharges particulate material supplied by a high pressure reactor;
  a collecting vessel that collects the particulate material discharged from the supply vessel and selectively discharges the particulate material;
  a receiving vessel that receives the particulate material discharged from the collecting vessel;
  a conveyor line that pneumatically conveys the particulate material discharged from the supply vessel to the collecting vessel using a gas exiting the high pressure reactor as a carrier gas;
  a discharge conduit for discharging the carrier gas from the collecting vessel;
  means for controlling the rate at which the carrier gas is discharged from the collecting vessel to control the flow rate of the particulate material in the conveyor line and to control the pressure in the collecting vessel; and
  means for conveying the particulate material directly from the collecting vessel to the receiving vessel at essentially the same pressure as is prevailing in the receiving vessel.

16. An apparatus according to claim 15, further comprising heat exchange surfaces disposed along the conveyor line.

17. An apparatus according to claim 16, further comprising elements, disposed in the supply vessel, for fluidizing the particulate material in the supply vessel in such a way that air used for the fluidization is mixed in the carrier gas, thus decreasing the dew point of the carrier gas.

18. An apparatus according to claim 15, further comprising a filter disposed in the discharge conduit, wherein the means for controlling the rate at which the carrier gas is discharged from the collecting vessel includes a control valve arranged downstream from the filter, and the discharge conduit is in flow communication with the open air.

19. An apparatus according to claim 15, wherein a discharge conduit for the carrier gas is in flow communication with the receiving vessel.

20. An apparatus according to claim 19, further comprising more than one parallel line for the discharge of the carrier gas provided between the collecting vessel and the receiving vessel, which lines are provided with a constantly open flow restricting element and a shut-off valve.

21. An apparatus according to claim 20, wherein the flow restricting elements are easily changeable.

22. An apparatus according to claim 15, wherein the collecting vessel has an elongated form and is disposed in a vertical orientation, and the discharge conduit for the carrier gas is attached to a bottom section of the collecting vessel.

23. An apparatus according to claim 22, further comprising more than one discharge conduit for the carrier gas, which are attached to the collecting vessel at various levels.

24. An apparatus according to claim 15, further comprising a gas tight inlet valve disposed in the conveyor line before the collecting vessel and a gas tight discharge valve disposed between the collecting vessel and the receiving vessel.

25. An apparatus according to claim 15, wherein the collecting vessel is disposed above the receiving vessel and further comprising a valve arranged between the vessels, through which valve the particulate material may fall down into to the receiving vessel.

26. An apparatus according to claim 16, wherein the heat exchange surfaces reduce the temperature of the particulate material conveyed through the conveyor line to a temperature of less than 300° C.

27. A method according to claim 1, wherein the supply vessel is at a pressure of at least two bar.

28. An apparatus according to claim 15, wherein the supply vessel is at a pressure of at least two bar.

* * * * *